United States Patent [19]

Bekele

[11] Patent Number: 5,075,143
[45] Date of Patent: Dec. 24, 1991

[54] HIGH BARRIER IMPLOSION RESISTANT FILMS

[75] Inventor: Solomon Bekele, Taylors, S.C.

[73] Assignee: W. R. Grace & Co.-Conn, Duncan, S.C.

[21] Appl. No.: 414,988

[22] Filed: Sep. 29, 1989

[51] Int. Cl.⁵ .............................................. B29D 22/00
[52] U.S. Cl. .................................. 428/36.6; 428/35.2; 428/34.3; 428/518; 428/520
[58] Field of Search ................. 428/35.2, 34.3, 36.6, 428/520, 518

[56] References Cited

U.S. PATENT DOCUMENTS

| 4,424,243 | 1/1984 | Nishimoto et al. | 428/36 |
| 4,886,690 | 12/1989 | Davis et al. | 428/36.6 |
| 4,909,726 | 3/1990 | Bekele | 428/34.3 |
| 4,927,691 | 5/1990 | Bekele | 428/35.2 |

FOREIGN PATENT DOCUMENTS

| 0051480 | 5/1982 | European Pat. Off. . |
| 0140711 | 5/1985 | European Pat. Off. . |
| 0243510 | 11/1987 | European Pat. Off. . |
| 53-97057 | 8/1978 | Japan . |

Primary Examiner—Edith L. Buffalow
Attorney, Agent, or Firm—John J. Toney; William D. Lee, Jr.; Leigh P. Gregory

[57] ABSTRACT

A multi-layer film useful in vacuum skin packaging and other vacuum packaging applications, and having a combination of good implosion resistance, formability and high oxygen barrier characteristics, includes a core layer having an oxygen barrier material, intermediate layers of EVA or other ethylene homopolymer or copolymers, polymeric adhesive layers which bond the intermediate layers to respective surfaces of the core layer, a first outer heat-sealable layer, a second outer heat resistant layer, and two moisture resistant layers disposed between respective outer and intermediate layers.

9 Claims, 1 Drawing Sheet

HIGH BARRIER IMPLOSION RESISTANT FILMS

BACKGROUND OF THE INVENTION

The present invention relates to packaging films, and more specifically to packaging films useful in vacuum packaging applications.

Vacuum packaging, and particularly vacuum skin packaging has become an increasingly attractive way of packaging fresh red meats. The final package presents a tight fitting, clear package which protects the food article from the external environment. However, the demands imposed on the packaging material used in vacuum packaging, and especially in vacuum skin packaging, are high.

Two particular characteristics which are especially desirable in vacuum skin packaging applications, especially in the packaging of fresh beef, pork, broiled and browned pork, shingled turkey breast, and other meat items, are implosion or breakage resistance and shelf life.

Generally, products that have cavities or undercuts are especially prone to implosions or leakers created by failure of the film during the vacuum skin packaging process. Using standard materials, package failures as high as 60% have occurred. Thus, in actual practice, conventional films tend to be broken when subjected to the high stretch ratios and particular projections, undercuts or recesses present on the material being packaged.

At the same time, high oxygen barrier characteristics are required in packaging material where the product to be packaged is sensitive to and degrades in the presence of oxygen. Fresh red meat products in particular typically require packaging materials with high oxygen barrier properties in order to insure adequate or extended shelf life during storage, distribution and retail display under high humidity conditions.

The vacuum skin packaging process itself is now well known in the art. The packaging material generally comprises a top web and a bottom web which are each sent to the packaging station. The meat or other food to be packaged is placed onto the bottom web before the packaging station. The upper web comprises a film of a thermoplastic material which is optionally preheated and then fed to the packaging station and over the product on the bottom web. There it is usually heated by contact with a heated member, for instance the inner surface of a "dome". The space between the top and bottom webs around the food is then evacuated and the top web is allowed to come into contact with the bottom web and with the food. The top web may be held against the dome for instance by vacuum pressure which is released when it is desired to allow the top web to come into contact with the bottom web. Sealing of the top and bottom webs is achieved by a combination of heat from the dome and pressure difference between the inside of the package and the outside atmosphere and can be aided by mechanical pressure and/or extra heating. The heat that is supplied in the process is merely to allow the web to form and take up the form of the food product being packaged.

Skin packaging and particular developments of it are further described in European patent publication 243510 (Botto et al) disclosing a coextruded multilayer film having the structure ionomer/EVA (18%)/adhesive/EVOH/EVA (18%)/high density polyethylene. The film in this disclosure is useful in vacuum packaging food products. "EVOH" here represents ethylene vinyl alcohol copolymer. "EVA" here represents ethylene vinyl acetate copolymer. Several similar structures are also disclosed in the Botto et al reference.

It is an object of the present invention to provide a packaging material useful in vacuum packaging and especially vacuum skin packaging applications.

It is a further object to provide such a material which has good resistance to implosion or breakage, good formability, combined with extended shelf life for food products such as fresh red meat products.

SUMMARY OF THE INVENTION

In one aspect of the invention, a high oxygen barrier implosion resistant film comprises a core layer of an oxygen barrier polymer material; two intermediate layers each comprising ethylene vinyl acetate copolymer; two polymeric adhesive layers which each bond an intermediate layer to a respective surface of the core layer; a first outer layer comprising a heat sealable polymeric material; and a second outer layer comprising a heat resistant polymeric material; and two moisture resistant layers which each bond an intermediate layer to a respective outer layer.

BRIEF DESCRIPTION OF THE DRAWINGS

Further details are given below in reference to the sole drawing figure wherein.

DESCRIPTION OF THE PREFERRED EMBODIMENTS

Figure 1:
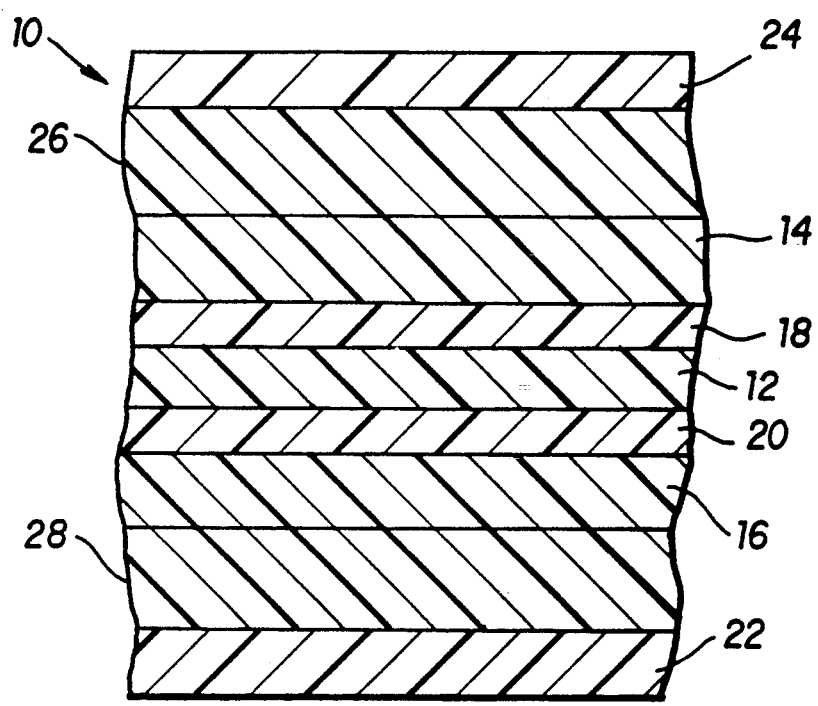
FIG. 1 is a schematic cross section of the preferred embodiment of a multilayer film of the invention.

Referring to FIG. 1 a nine layer film 10 is designated primarily for vacuum packaging and especially for vacuum skin packaging. The core layer 12 of this film is an oxygen barrier material designed to provide increased shelf life in applications where the packaged product is sensitive to and deteriorates from the presence of oxygen in the interior environment of the package. Such applications are especially useful in packaging fresh red meats and other meat products and cheeses. In this embodiment, core layer 12 comprises an oxygen barrier material and preferably ethylene vinyl alcohol copolymer.

Intermediate layers 14 and 16 preferably comprise ethylene vinyl acetate copolymer (EVA), or alternatively other ethylene homopolymers or copolymers.

Preferable EVA resins are those with relatively high vinyl acetate content, more preferably between about 15 and 25% vinyl acetate by weight, and most preferably about 18% vinyl acetate by weight of the copolymer.

A suitable resin for layers 14 and 16 is Elvax 3165 available from Dupont Chemicals, with a melt index of about 0.7 decigrams per minute (ASTM D1238). An alternative resin is Norchem NPE 3311, having a vinyl acetate content of 19% by weight, and a melt index of between about 2.5 and 3.5 decigrams per minute (ASTM D1238).

Layers 18 and 20, located between core layer 12 and the respective intermediate layers 14 and 16, comprise a polymer and preferably a polyolefin and more preferably low density polyethylene. This material is preferably chemically modified to enhance its adhesive characteristics. One example of a suitable resin for layers 18 and 20 is Plexar TM 169, a chemically modified low density polyethylene available from Quantam/USI. Another suitable material is Bynel 385 from Dupont.

Layer 22 comprises a heat resistant material and preferably high density polyethylene. A suitable commercial material is Fortiflex J60-800C-147, a high density polyethylene available from Soltex.

The other outer layer, layer 24, is useful as a sealant layer when sealing the multilayer film to itself or to another film or laminate. It preferably comprises a heat sealable polymeric material and more preferably a very low density polyethylene such as Attane 4004 available from Dow. Other ethylene alpha-olefin copolymers including those commonly designated as linear low density polyethylene or very low density polyethylene may be used. Ionomer resins and ethylene vinyl acetate copolymer may also be used for sealant layer 24.

It is well known that ethylene vinyl alcohol copolymer, the preferred material for core layer 12, exhibits very high oxygen barrier characteristics at low relative humidities, but lesser barrier characteristics (ie, greater oxygen transmission) at higher relative humidities. To protect the core layer from excessive exposure to moisture either from the contained food product such as fresh red meat, or from the outside environment (ie, outside the package material wall) moisture resistant layers 26 and 28 are included in the preferred packaging material structure. The term "moisture resistant" is used herein to mean a polymer material which helps to reduce the ingress of moisture into the core layer 12 from either the interior of the package or from the outside of the package, ie from either the food product and the atmosphere surrounding the food product, or from the ambient environment around the package such as an in-store display case.

Preferred materials for layers 26 and 28 are ionomer, ethylene acrylic acid copolymer, and ethylene methacrylic acid copolymer, and ultra low density polyethylene. While all of these materials provide the required protection of the core layer 12 from moisture from inside or outside the package, the ionomer is the preferred material because it helps to maintain the implosion resistance of the packaging material better than the alternative materials just mentioned.

In the heat sealable layer 24, small amounts of suitable additives can be added such as antiblocking agents to enhance the handling and usefulness of the packaging material of the present invention.

It has been found that the shelf life of meat products packaged in materials of the present invention has been extended from about five days to fourteen days or more. Even allowing for differences in the thickness of the core layer of EVOH, shelf life has been doubled by the use of the present materials compared with packaging materials having a similar structure but no moisture resistant layers 26 and 28.

Therefore, substantial improvement in shelf life, without significant loss of implosion resistance has been obtained by the use of the present invention.

The film of the present invention is preferably produced by conventional coextrusion techniques wherein coextrusion of the various layers produces the final multilayer film.

The coextruded tape resulting from the coextrusion of the individual layers is preferably irradiated to between about 12 and 18 megarads dosage and most preferably to between about 14 to 16 megarads dosage.

To some extent, chemical cross-linking agents may be utilized in addition to or in lieu of irradiation of the coextruded tape.

Preferred thicknesses of the preferred embodiment are either four mils or six mils. Of course, variations in the initial coextruded tape thickness and the final film thickness can be made.

The individual layers may vary in thickness, although for the sake of economy the core layer 12 is preferably a relatively thin layer.

It is preferred that moisture resistant layers 26 and 28 together comprise between about 35 and 50% of the thickness of the overall film.

It is also preferred that the moisture resistant layer 26 be thicker than the adjacent intermediate layer 14, and that likewise moisture resistant layer 28 be thicker than the adjacent layer 16, and that their relationship in thickness be preferably about 60/40 in terms of relative thicknesses so that optimum implosion resistance, oxygen barrier properties and formability be obtained. This range may vary with corresponding changes in the overall film performance, and the film will function as a vacuum packaging material even when the moisture resistant layers are thinner than the respective adjacent intermediate layers.

Modifications of the invention within the purview of one skilled in the art are believed to be within the spirit and scope of the invention as claimed below. Certain modifications such as the use of conventional lamination or extrusion coating techniques instead of coextrusion will be obvious to those skilled in the art after a review of the specification.

What is claimed is:

1. A high oxygen barrier implosion resistant film comprising:
   (a) a core layer of ethylene vinyl alcohol copolymer;
   (b) Two intermediate layers each comprising ethylene vinyl acetate copolymer;
   (c) two polymeric adhesive layers which each bond an intermediate layer to a respective surface of the core layer;
   (d) a first outer layer, comprising a heat sealable polymeric material;
   (e) a second outer layer, comprising a heat resistant polymeric material; and
   (f) two moisture resistant layers which each bond an intermediate layer to a respective outer layer.

2. The film according to claim 1 wherein the two adhesive layers comprise a chemically modified ethylene homopolymer or copolymer.

3. The film according to claim 1 wherein the first outer layer comprises an ionomer.

4. The film according to claim 1 wherein the first outer layer is an ethylene alpha-olefin copolymer.

5. The film according to claim 1 wherein the first outer layer comprises a linear low density polyethylene.

6. The film according to claim 1 wherein the first outer layer comprises a very low density polyethylene.

7. The film according to claim 1 wherein the film is cross-linked.

8. The film according to claim 1 wherein the second outer layer comprises a high density polyethylene.

9. The film according to claim 1 wherein the moisture resistant layers each comprise a polymeric material selected from the group consisting of ionomer, ethylene acrylic acid copolymer, and ethylene methacrylic acid copolymer and ultra low density polyethylene.

* * * * *